(12) United States Patent
Hemphill et al.

(10) Patent No.: US 9,056,572 B2
(45) Date of Patent: Jun. 16, 2015

(54) SAFETY CONE AND BARRELL PLACEMENT AND RETRIEVAL APPARATUS

(75) Inventors: Eric Hemphill, Murphy, TX (US); John Davis, McKinney, TX (US)

(73) Assignee: NORTH TEXAS TOLLWAY AUTHORITY, Plano, TX (US)

( * ) Notice: Subject to any disclaimer, the term of this patent is extended or adjusted under 35 U.S.C. 154(b) by 452 days.

(21) Appl. No.: 13/327,508

(22) Filed: Dec. 15, 2011

(65) Prior Publication Data

US 2013/0156532 A1    Jun. 20, 2013

(51) Int. Cl.
  *B60P 1/44*   (2006.01)
  *B60P 1/02*   (2006.01)
  *E01F 9/014*  (2006.01)

(52) U.S. Cl.
  CPC .............. *B60P 1/02* (2013.01); *B60P 1/4457* (2013.01); *B60P 1/4421* (2013.01); *E01F 9/014* (2013.01)

(58) Field of Classification Search
  CPC ....... B60P 1/4421; B60P 1/4457; E01F 9/014
  USPC .......................................... 414/508, 540, 545
  See application file for complete search history.

(56) References Cited

U.S. PATENT DOCUMENTS

| | | | | | |
|---|---|---|---|---|---|
| 3,110,390 | A | * | 11/1963 | Marvin | 414/679 |
| 3,167,190 | A | * | 1/1965 | Floyd et al. | 414/26 |
| 3,342,353 | A | * | 9/1967 | Davis | 414/345 |
| 4,408,666 | A | * | 10/1983 | Lawson | 172/19 |
| 4,777,890 | A | * | 10/1988 | Raymond | 111/100 |
| 5,848,870 | A | * | 12/1998 | Smith et al. | 414/540 |
| 6,364,400 | B1 | * | 4/2002 | Unrath | 296/1.05 |
| 6,752,582 | B2 | | 6/2004 | Garcia | |
| 7,581,918 | B2 | | 9/2009 | Jordan | |
| 8,177,471 | B2 | * | 5/2012 | Nespor | 414/545 |
| 8,523,508 | B2 | * | 9/2013 | Hurler | 414/545 |
| 8,979,465 | B2 | * | 3/2015 | Brown | 414/518 |
| 2005/0058528 | A1 | * | 3/2005 | Wroblewski | 414/545 |
| 2006/0127207 | A1 | * | 6/2006 | Corbett | 414/508 |
| 2007/0140820 | A1 | * | 6/2007 | Miller | 414/540 |
| 2007/0207019 | A1 | * | 9/2007 | Rohatinovici | 414/508 |
| 2010/0290880 | A1 | | 11/2010 | Brown | |

FOREIGN PATENT DOCUMENTS

| | | | | |
|---|---|---|---|---|
| EP | 0500474 B1 * | 6/1995 | | E01F 9/014 |
| GB | 2423977 A * | 9/2006 | | B66F 9/12 |

(Continued)

OTHER PUBLICATIONS

Safe t cone—Road Cone Laying Machine—Overview, Aug. 23, 2012 http://www.safetcone.com/index.php?option=com_content&task=view&id=12&Itemid=28.

(Continued)

*Primary Examiner* — James Keenan
(74) *Attorney, Agent, or Firm* — Locke Lord LLP

(57) ABSTRACT

An apparatus for placing and retrieving traffic devices in an efficient manner and with improved safety features is disclosed. The apparatus is particularly suitable for use with traffic barrels and other large items needed to block off roadway construction areas. The apparatus is also suitable for use with existing trucks, reducing the need to purchase expensive and complicated equipment, and may be adapted to allow traffic devices to be placed or retrieved from either side of the truck. The time required for placing traffic devices and the safety of operators is improved with use of the apparatus according to the invention.

25 Claims, 14 Drawing Sheets

(56) References Cited

FOREIGN PATENT DOCUMENTS

| GB | 2493762 A | * | 2/2013 | ................ | B60P 1/44 |
| WO | WO 03/102309 A1 | * | 12/2003 | .............. | E01F 9/014 |
| WO | WO 2011/124694 A1 | * | 10/2011 | ................ | B60P 1/44 |

OTHER PUBLICATIONS

Traf-tech Traffic Management Equipment, Aug. 23, 2012 http://www.traftech.net/mct_series_cone_truck.php.
Traf-tech Traffic Management Equipment, Aug. 23, 2012 http://www.traftech.net/sact_series_cone_truck.php.
Traf-tech Traffic Management Equipment, Aug. 23, 2012 http://www.traftech.net/act_series_cone_truck.php.
Thraf-tech Traffic Management Equipment, Aug. 23, 2012 http://www.traftech.net/acm_series_cone_truck.php.
Roadway Work Zone Safety Trailer 17' Specifications, Aug. 23, 2012 http://www.centrevilletrailer.com/trailers/58.cfm.
Cone Setter CS 3100, Aug. 23, 2012 http://www.epicsolutions.us/products/safety-equipment/cone-setter-cs3100/.
Cone Retriever CR 3200 Series, Aug. 23, 2012 http://www.epicsolutions.us/products/safety-equipment/cone-retriever-cr3200-series/.
Autocone 130-Automated Cone Placement, Aug. 23, 2012 http://www.innovativequip.com/index.htm.

* cited by examiner

SAFETY CONE AND BARRELL PLACEMENT AND RETRIEVAL APPARATUS

BACKGROUND OF THE INVENTION

1. Field of the Invention

This invention relates to an apparatus and method for placing and retrieving safety cones, barrels, signs, barriers and other devices used as part of construction or maintenance projects on highways, roadways, streets, and parking lots that improves operator safety and efficiency.

2. Description of Related Art

Operator safety is a frequently encountered problem in highway and roadway construction projects. Safety barrels, cones, signs, barriers, and other devices are typically used to section off parts of roads where construction or maintenance projects are underway or about to be commenced to help insure the safety of workers in the work zone, to inform drivers of the construction or maintenance project, and to keep unauthorized vehicles out of the work zone. Typically, the placement of these barrels, cones, signs, barriers, and other devices is done by a combination of a truck and at least one worker walking on the road alongside the truck, with another worker in the bed or back of the truck handing the barrels, cones, signs, or other devices down to the worker on the road where they are set in place. Retrieval of these traffic devices is typically done in the same manner. However, there are safety concerns with the worker on the road, outside of the truck, as that worker is at increased risk of being hit by a passing vehicle. Additionally both workers, the one in the back or bed of the truck and the one on the road, are at increased risk of injury given the height from or to which these traffic devices have to be manually lowered or raised to get them from the truck to the road and back, particularly with some of the heavier traffic devices, such as barrels. Additionally, it takes substantial time for workers to walk alongside the truck while placing or retrieving these traffic devices, which adds to the amount of time the worker is at risk, as well as, increases the overall time the road is closed or partially blocked for completion of the construction project and placing and retrieving the traffic control devices.

One system for improving worker safety and decreasing the time for placing and retrieving these traffic devices is an automated conveyor type system, such as that described in U.S. Pat. No. 7,581,918 and U.S. Application Pub. No. 2010/0290880. These automated systems have the advantage of requiring fewer workers, although they do not eliminate the need for workers to be present on the truck to load or unload the traffic devices from the conveyor system and to correct any misalignment or jammed equipment during operation. They also have the drawbacks of having more mechanical parts that could become jammed or stop working during the placement or retrieval of these traffic devices and no satisfactory way of up-righting any traffic devices that fall over during placement.

The system described in the '918 patent includes mechanisms to prevent the traffic devices from toppling or becoming misaligned, including guide rails and a topple-bar, but the topple bar has to be changed out with a topple bar of a different design to accommodate different sizes and shapes of traffic devices, such as cones with a lamp or beacon secured to the top of the cone. While the system described in the '918 patent indicates it may be used for any type of traffic device, it would require substantial modification to accommodate traffic devices, such as barrels and signs, that are substantially larger than or of substantially different shape than typical traffic cones, making it impractical to use in situations where different types of traffic devices are needed. In order to retrieve the traffic devices using the automated system described in the '918 patent, the truck is required to drive in reverse, which increases the danger of an accident and the possibility of traffic devices being skipped if the truck is not properly aligned with the traffic devices.

The system described in U.S. Application Pub. No. 2010/0290880 is suitable for use with barrels, but not cones and other lighter weight traffic devices, such as signs. Additionally, the system protrudes beyond the sides of the truck to which it is mounted, making the overall size of the vehicle much wider than usual. This increased width makes it more difficult for the truck to maneuver in tight construction areas and is more dangerous for passing vehicles.

Another system for improving worker safety and decreasing the time for placing these traffic devices is an automated drop type system, such as that described in U.S. Pat. No. 6,752,582. This system has the benefit of being attachable to any vehicle, but is limited to use with a particular type of flexible cone and does not accommodate barrels and other traffic devices. Additionally, this system is not suitable for retrieving cones, only placing them.

Several other systems with automated features are also known. These systems are available from Traf-tech (www.traftech.net), Innovative Equipment and Centreville Manufacturing, Inc. (www.innovativequip.com and www.centervilletrailer.com), SafeTcone (www.safetcone.com), and Epic Solutions (www.epicsolutions.us). These systems have many of the benefits and drawbacks of other automated systems. Although some of these systems may be mounted to existing truck or trailers, many of these systems are integrated into a heavy duty trucks and are therefore large and expensive pieces of equipment. These automated systems are suitable only for use with cones and not other traffic devices.

Innovative Equipment and Centreville Manufacturing, Inc. (www.innovativequip.com and www.centervilletrailer.com), also offer a trailer (the Workzone Safety Trailer) for use in the manual placement and retrieval of barrels, cones, and other traffic devices that has the benefit of not requiring a worker to be walking on the roadway. However, there are several drawbacks to this trailer system. For example, the operator has to manually lift heavy traffic devices, such as barrels, to place and retrieve them from the roadway, the operator is located at the rear end of the trailer where many vehicle collisions occur, and the trailer lacks many safety features for the operator.

SUMMARY OF THE INVENTION

The apparatus disclosed herein facilitates the placement and retrieval of various types of traffic devices with increased worker safety and efficiency. The apparatus is suitable for use with barrels, cones, signs, barriers, and other devices used as part of construction or maintenance projects to warn passing vehicles or pedestrians, block off the construction or maintenance site, protect workers in the work zone, and to keep unauthorized vehicles out of the work zone. The apparatus includes several features that increase the safety of the operators while increasing the speed with which these traffic devices may be placed or retrieved.

According to one embodiment of the invention, an apparatus is disclosed for placing and retrieving traffic devices using two workers or operators to move the traffic devices between a storage area on a truck to which the apparatus is attached and a roadway without requiring either operator to walk on the roadway. The areas in which the operators are located are at two different elevations, one equal or nearly equal to the elevation of the truck bed and the other closer to the roadway. The traffic devices are loaded onto a moveable platform that raises and lowers the devices between the elevations where the operators are located.

In a preferred embodiment of the invention, the apparatus is located along the side of the truck, between the front and rear tires, and is no wider than the widest part of the truck. The apparatus further includes safety barriers and railings to help prevent the operators from falling while the truck is operational. The apparatus also includes a set of fold-up steps or a ladder to facilitate the operator accessing the truck bed while the truck is stopped.

According to another embodiment of the invention, the apparatus includes two areas on the lower elevation closer to the roadway and two moveable platforms, one on each side of the truck. The elevated operator area is located between the other two operator areas. This dual-sided embodiment allows traffic devices to be placed on or retrieved from the roadway from either side of the truck, or if necessary and with an additional operator, from both sides of the truck simultaneously. Although the lower elevation area and platform for the single-sided embodiment may be located on either side of the truck, when they are on the left side the truck may have to drive the wrong-way down a roadway (under U.S. right-side driving practice) in order to place traffic devices on the right side of the road if there is not sufficient space on the shoulder or an available emergency lane. Having a dual-sided embodiment makes it easier to place traffic devices on either side of the roadway without requiring the truck to drive the wrong-way or to drive on the shoulder of the road.

According to other embodiments of the invention, a number of safety and convenience features are preferably included. These include a safety harness for the operator in the elevated operator area to prevent ejection from the truck, movable safety railing to help steady the operator in the elevated area during operation and to prevent falling, a safety barrier to block off access to the platform area while it is moving, a height adjustable safety rail for the operator in the lower elevation operator area, and a varying elevation for the lower operator area.

There are several advantages to the embodiments of the apparatus disclosed herein not previously achievable by those of ordinary skill in the art using existing technologies. These advantages include, for example, the ability place and retrieve a wide variety of traffic devices, rather than being limited to cones as in many of the prior art systems. Additionally, the apparatus may be added to an existing truck with relative ease and at little cost, thereby avoiding the cost of purchasing expensive new equipment where the system is integrated into a heavy duty truck. There are also several safety advantages, including, a reduction in worker injuries because the operators are located within the apparatus and not exposed by walking on the roadway and the risk of being hit by a passing vehicle, the operators do not have to lift the traffic devices more than a few inches, the operators have barriers and safety rails to keep them from falling on the truck bed or off the truck during operation. The apparatus also has several operational advantages, including that it may be operated in tighter construction areas because the apparatus does not protrude beyond the widest point of the truck and there are fewer moving or automated parts to malfunction or become jammed during operation.

The present apparatus has the disadvantage of requiring at least three workers—the two operators of the apparatus and the driver of the truck—compared to fully or semi-automated systems which require only a driver or a driver and one operator. Although this configuration increases worker costs, it is a safer system to operate. Many of the prior art automated systems use only the truck driver to operate the system, which may distract the driver and make driving the truck more dangerous. Additionally, the higher costs for additional workers are sufficiently offset by the savings and benefits achieved by increased worker safety, the speed with which traffic devices may be placed and retrieved compared to the conventional method, the lower cost of the apparatus compared to fully automated systems, the reduction in repair and maintenance costs and downtime associated with the more mechanically complex fully or semi-automated systems, and the flexibility to use the apparatus with a variety of traffic devices of different sizes and weights that cannot be achieved with automated systems.

It will also be appreciated by those of ordinary skill in the art upon reading this disclosure that additional features may be added to the apparatus and the apparatus may be configured or oriented in other ways within the scope of the invention.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
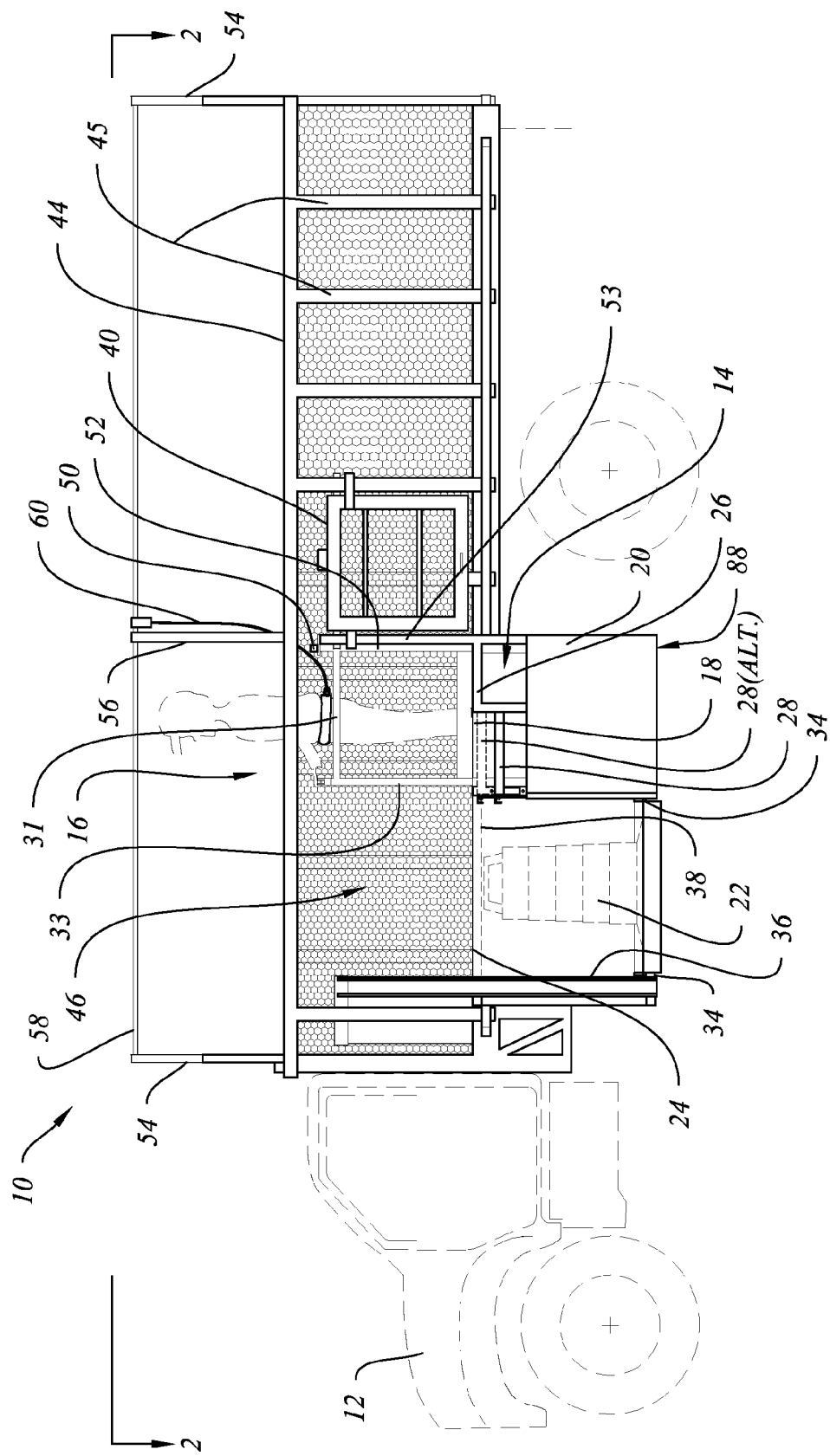
FIG. 1 is a side elevational view of one embodiment of the present invention.
Figure 3:
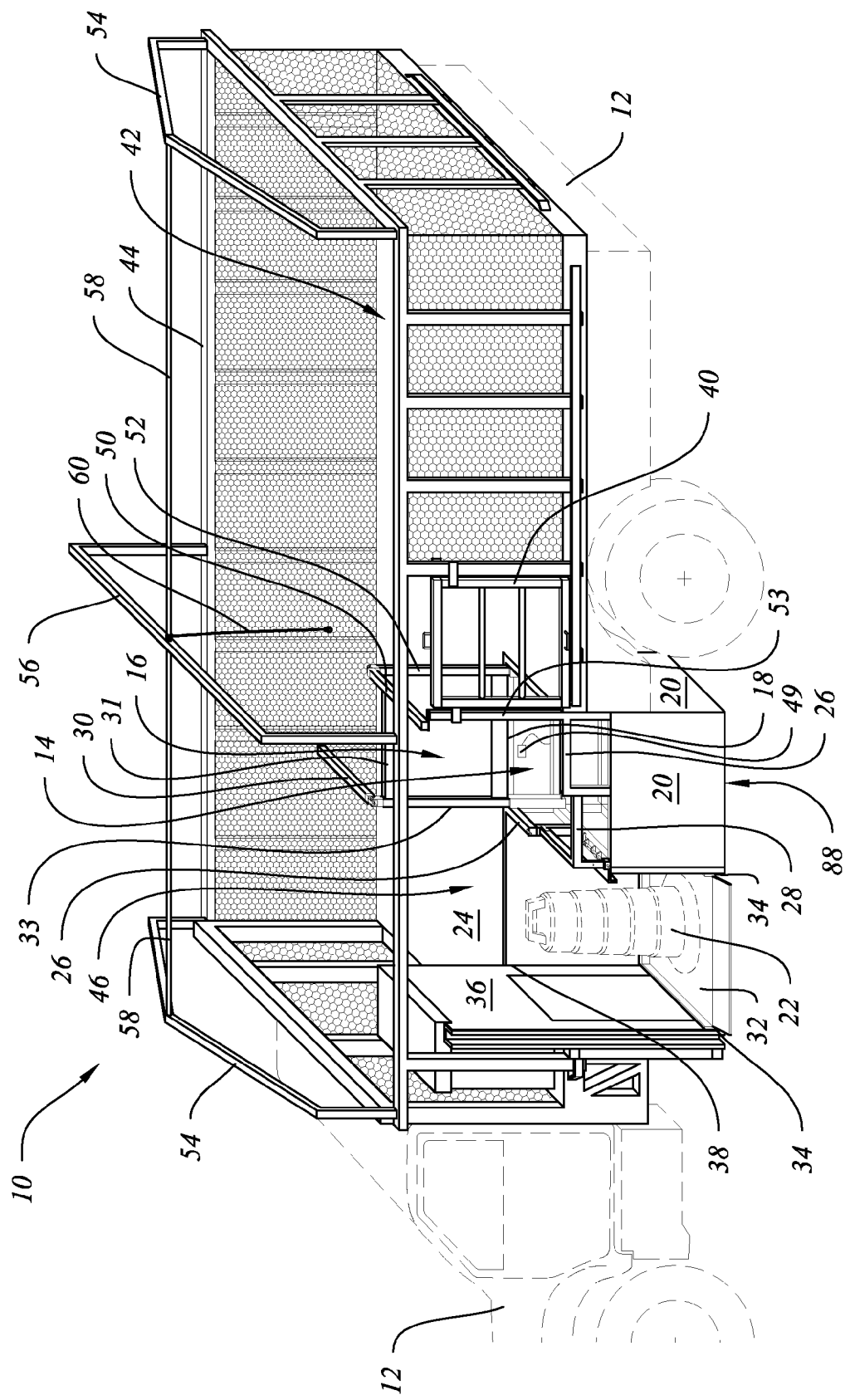
FIG. 3 is a perspective view of the embodiment of the present invention according to FIG. 1.

FIG. 1 depicts a side elevational view and FIG. 3 depicts a side perspective view of a traffic device placement and retrieval apparatus 10 according to one embodiment of the present invention. The apparatus 10 is preferably attached to a modified flat-bed truck 12 wherein a portion of the bed 24 and any side walls 44 have been cut away to accommodate the apparatus 10. The cab and other features of truck 12 depicted in the figures are to illustrate relative locations for elements of apparatus 10 (such as a front or forward direction being closer to the cab of truck 12), but no particular features of truck 12 are necessary for use of apparatus 10. Apparatus 10 includes a first operator area 14 in which an operator is located and a second operator area 16 in which a second operator is located during placement and retrieval of traffic devices, such as a barrel 22. An operator is depicted in operator area 16 on FIG. 1, but not in operator area 14, for ease of demonstrating safety harness 60 (described below). The operators in areas 14 and 16 are preferably standing, but one or both may also be in a seated position. The second operator area 16 is preferably elevated relative to the first operator area 14, with the lower surface 88 of operator area 14 being close to the roadway on which the barrel 22 is to be placed or later retrieved and the lower surface of operator area 16 being at or near the level of truck bed 24. Operator area 14 includes sides 20 that are preferably solid surfaces to provide additional safety for the operator located in operator area 14. These solid surfaces prevent roadway debris from being kicked up or blown into operator area 14 where they might come in contact with the operator's body.

Apparatus 10 also includes movable platform 32 that may be raised or lowered between positions 34 and 38. Preferably, elevated position 38 is at or near the level of truck bed 24 and lower position 34 is at or below the bottom level of sides 20 of operator area 14. Pulley cover 36 conceals the pulley system (not depicted) used to raise and lower platform 32. The pulley system is similar to that used in a fork lift and those of ordinary skill in the art will understand how to modify a fork lift mechanism or to design another system to raise and lower platform 32. Apparatus 10 also preferably includes a ladder 40 that may be lowered to allow operators to access the truck bed 24, including operator area 16, and may be closed and secured during operation of apparatus 10 or movement of truck 12. Ladder 40 preferably lifts up slightly from the closed position and then slides down at an angle to allow operators to access the truck. Alternatively, ladder 40 could be hinged to fold down and up. Ladder 40 need not be configured as a traditional ladder and other step-like configurations may be used.

Figure 2:
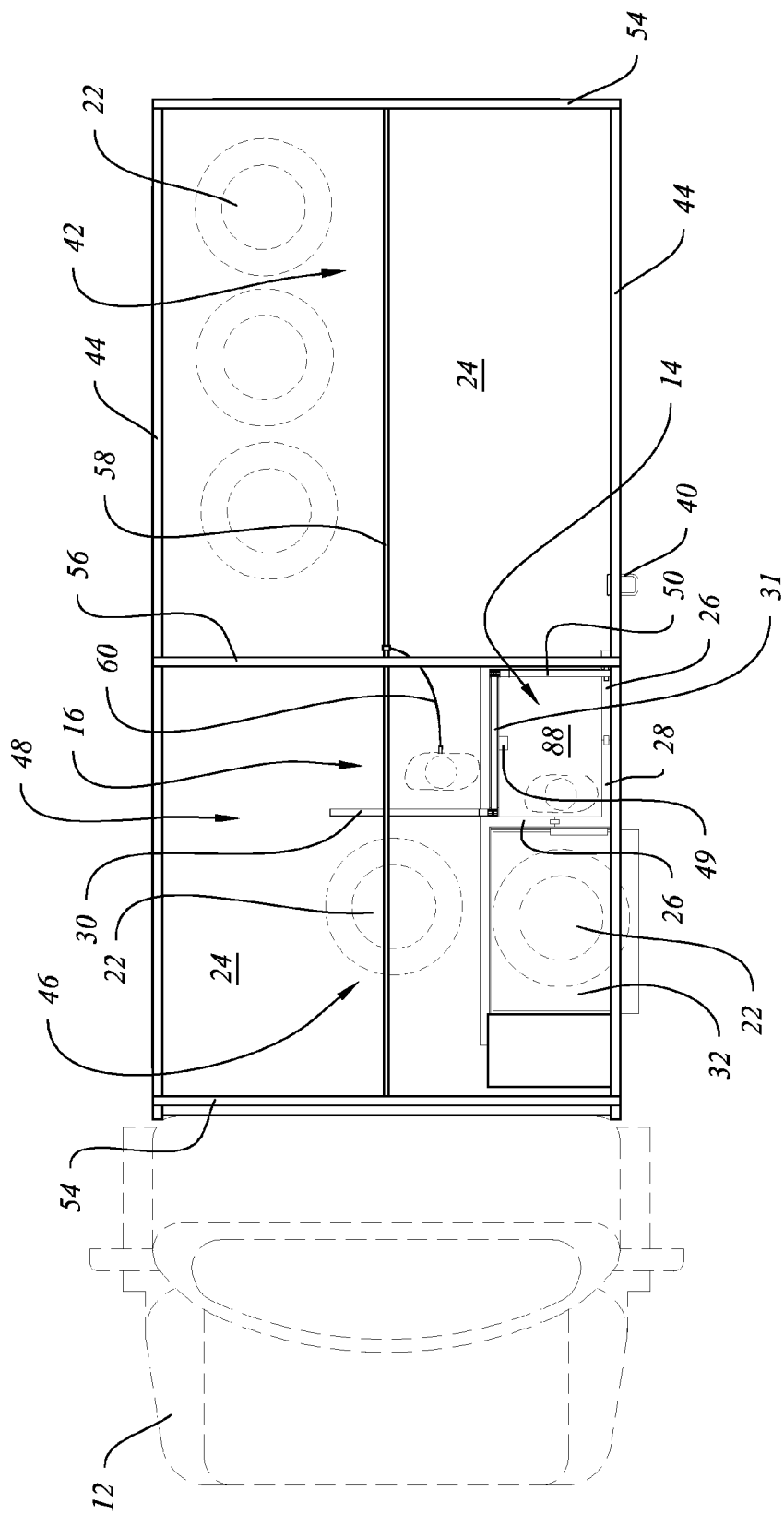
FIG. 2 is a top plan view of the embodiment of the present invention according to FIG. 1.

Referring to FIG. 2, which is a top view of apparatus 10 and truck 12 according to the embodiment in FIGS. 1 and 3, apparatus 10 is preferably used with truck 12 that includes a storage area 42 for storing extra traffic devices, such as barrels 22, until they are ready to be placed on the roadway or storing the traffic devices once they have been retrieved. Truck 12 also preferably includes side walls 44 around the perimeter of truck bed 24 other than where operator area 14 and platform 32 are located. Side walls 44 keep the traffic devices in storage area 42 from falling off truck 12 and add safety for the operator located in operator area 16. Side walls 44 also keep the operator from falling off truck 12 while the operator is in storage area 42. Side walls 44 are preferably at least 3 feet tall and made of a semi-open or mesh-like material supported by support rails 45 spaced at intervals along the side walls 44. Alternatively, side walls 44 may be solid or made of other materials and may be at varying heights.

Apparatus 10 preferably includes several barriers to provide additional safety for the operator in operator are 16. Referring to FIG. 2, Barrier 50 provides separation between storage area 42 and operator area 14 and provides a hand rail for additional assistance when climbing up or down ladder 40. Barrier 50 is preferably a bar with an open area between it and truck bed 24. This opening under barrier 50 allows the operator in operator area 14 to easily access operator area 14 from truck bed 24 after using ladder 40 to climb up to truck bed 24. This opening under barrier 50 also allows the operator in operator area 14 to easily access traffic devices that are stored near ladder 40, particularly smaller or lighter weight items where the use of platform 32 is not necessary. The operator located in operator area 16 has free access to storage area 42 to obtain or return traffic devices, such as barrel 22. When placing the traffic devices, the device is obtained from storage area 42 and placed in loading area 46 adjacent platform 32. Barriers 30 and 31 keep the operator in operator area 16 from falling out onto the open loading area 46, onto platform 32, or into operator area 14, where the operator may be injured or even fall out of the moving truck 12. Preferably barriers 30 and 31 are around three feet high to prevent falls, but are also low enough that the operator in operator area 16 can easily bend over barrier bar 30 when loading or unloading traffic devices from loading area 46 or bend over barrier bar 31 if the operator needs to access the operator in operator area 14. Barrier 30 is preferably a bar with an open area between it and truck bed 24 to allow traffic devices, such as barrel 22, to easily pass underneath or around barrier 30 into the loading area 46 without the operator in operator area 16 having to lift the traffic device over barrier 30, thereby reducing the risk of injury. Similarly, barrier 31 is preferably a bar with an open area between it and truck bed 24 to allow traffic devices to easily pass underneath or around barrier 31 into operator area 14. This opening is useful when it is desirable to quickly place a smaller size or light weight traffic device where it would not be necessary to use platform 32. The use of bars for barriers 30 and 31 also provide a convenient handle bar for the operator in operator area 16 to hold onto while truck 12 is moving, particularly during stopping and starting.

Referring to FIGS. 1 and 3, barrier 50 is supported by posts 52 and 53. Barriers 30 and 31 are supported by post 33, but post 33 may form part of either barrier if a solid or semi-solid surface is used for either barrier instead of a bar configuration. In the embodiment depicted in FIGS. 1, 2, and 3, barriers 30 and 31 do not enclose operator area 16 or storage area 42. There is a passage 48 (see FIG. 2) so that the operator in operator area 16 may easily access loading area 46 if necessary, such as to up-right barrel 22 if it falls over before being placed on platform 32. Alternatively, barrier bar 30 could connect to side wall 44 to enclose operator area 16 and storage area 42, although a passage under barrier bar 30 may still be open. The open nature of the preferred barriers 30 and 31 and the preferred lower height of barriers 30 and 31 make it possible for the operator in operator area 16 to access loading area 46 or operator area 14 by going over or under the barriers 30 and 31, preferably when truck 12 is not moving.

Apparatus 10 also preferably includes a safety harness system for the operator in operator area 16. This system includes railings 54 preferably located at both ends of truck bed 24 and railing 56 located near barrier 50 in an axial direction along the length of truck 12 and above barrier 50 in a vertical direction. Railings 54 and 56 support railing 58, which preferably is centered over the width of truck bed 24, runs the length of truck bed 24, and is elevated around 7 feet above truck bed 24. Attached to railing 58 is a releasable safety harness 60 that may be strapped onto the operator in operator area 16. Safety harness 60 is depicted as a belt-type harness, although other known harness mechanisms, such as an over-the-shoulder harness, could also be used. Safety harness 60 slides along railing 58 to allow the operator in operator area 16 to move about the back end of apparatus 10, and particularly in storage area 42. Safety harness 60 preferably is stopped from sliding along rail 58 toward the front of apparatus 10 by railing 56. The length of safety harness 60 allows the operator in operator area 16 to move from operator area 16 into loading area 46. Safety harness 60 provides additional safety for the operator in operator area 16 during movement of truck 12, particularly in the event truck 12 has to suddenly brake or is rear-ended by another vehicle safety harness 60 prevents the operator from being ejected from truck 12.

Referring to FIGS. 1, 2, and 3, once the operator in operator area 16 has placed barrel 22 in loading area 46, the operator in operator area 14 raises platform 32 to the elevated position 38, if the platform is not already in that position, using controls 49. The operator in operator area 16 then moves barrel 22 onto platform 32 and the operator in operator area 14 lowers platform 32 to its lower position 34. The operator in operator area 14 then moves barrel 22 off platform 32 and onto the roadway or other surface where barrel 22 is to be placed. Barriers 26 and 28 provide additional safety for the operator in operator area 14 to keep the operator from falling during operation. Barrier 28 is preferably lower than barrier 26 to provide the operator in operator area 14 with additional space to bend over barrier 28 to facilitate moving barrel 22 from the platform to the roadway or other surface. The vertical location of barrier 28 is most preferably adjustable relative to barrier 26 (as shown by the alternate position in FIG. 1) to accommodate operators of varying heights. A latch or pin mechanism may be used to hold barrier 28 in an elevated position. Barriers 26 and 28 are preferably bars with an open area between them and the sides 20 of operator area 14, which provide a convenient handle bar for the operator in operator area 14 to hold onto while truck 12 is moving, particularly during stopping and starting.

After moving barrel 22 from platform 32 onto the roadway or other surface, the operator in operator area 14 then raises platform 32 to its elevated position 38 so that the operator in operator area 16 can load another barrel, taken from storage area 42, from the loading area 46 to the platform. This process is repeated until all barrels or other traffic devices have been placed. To retrieve the barrels or other traffic devices, this process is repeated in reverse order. As each barrel is placed or retrieved, truck 12 moves forward along the roadway or other surface to the next location where a barrel is to be placed or retrieved (usually a few feet from the last barrel). It is not necessary for truck 12 to operate in reverse to retrieve the traffic devices.

Operator area 14 and platform 32 are preferably located along the side of truck 12 between the front and rear tires and do not protrude beyond the widest part of truck 12, as depicted in FIGS. 1, 2, and 3. These portions of apparatus 10 may also be located at the back or rear of truck 12, with either an orientation such that operator area 14 is on the side of truck 12 or on the rear end of truck 12, with modifications understood by those of ordinary skill in the art. As many vehicle collisions involve rear end impacts, the operator in operator area 14 is at greater risk if these portions of apparatus 10 are located at the back or rear of truck 12 and particularly if operator area 14 is oriented on the rear end of truck 12 rather than the side of truck 12. Thus the location and orientation of operator area 14 and platform 32 along the side of truck 12 and near the front of truck 12 is preferred.

Figure 4A:
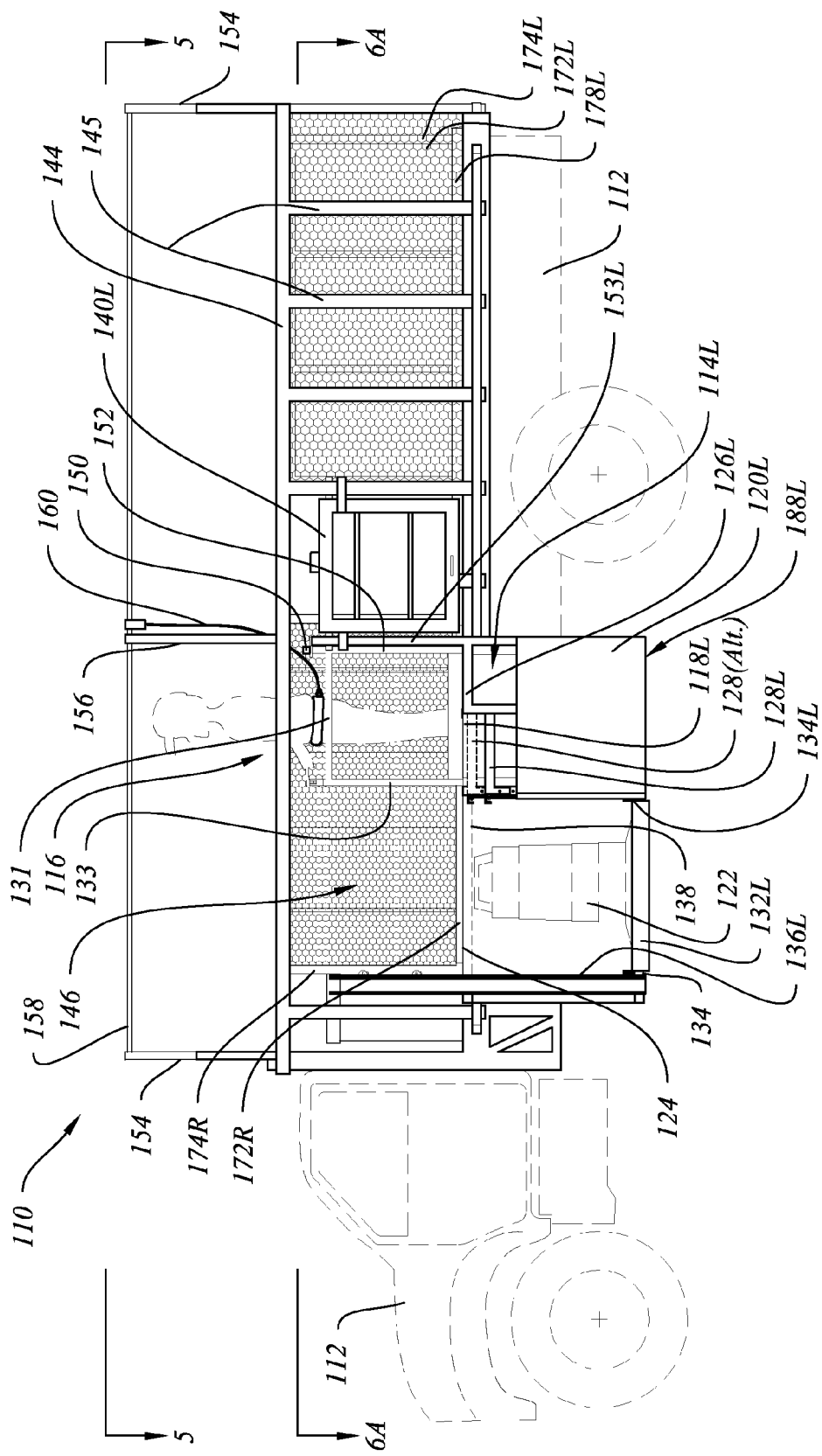
FIGS. 4A and 4B are side elevational views of a second embodiment of the present invention.
Figure 4B:
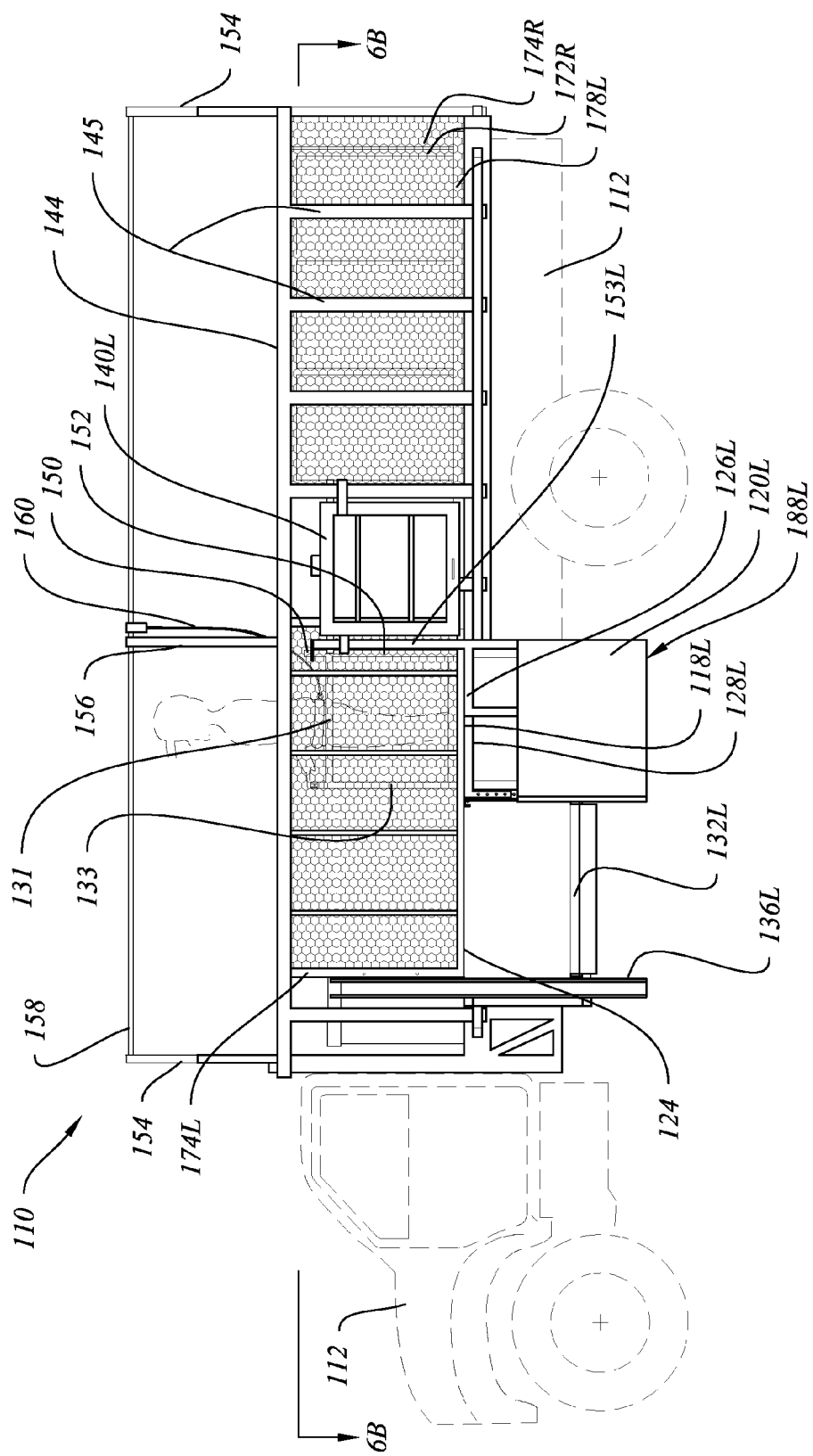
Figure 5:
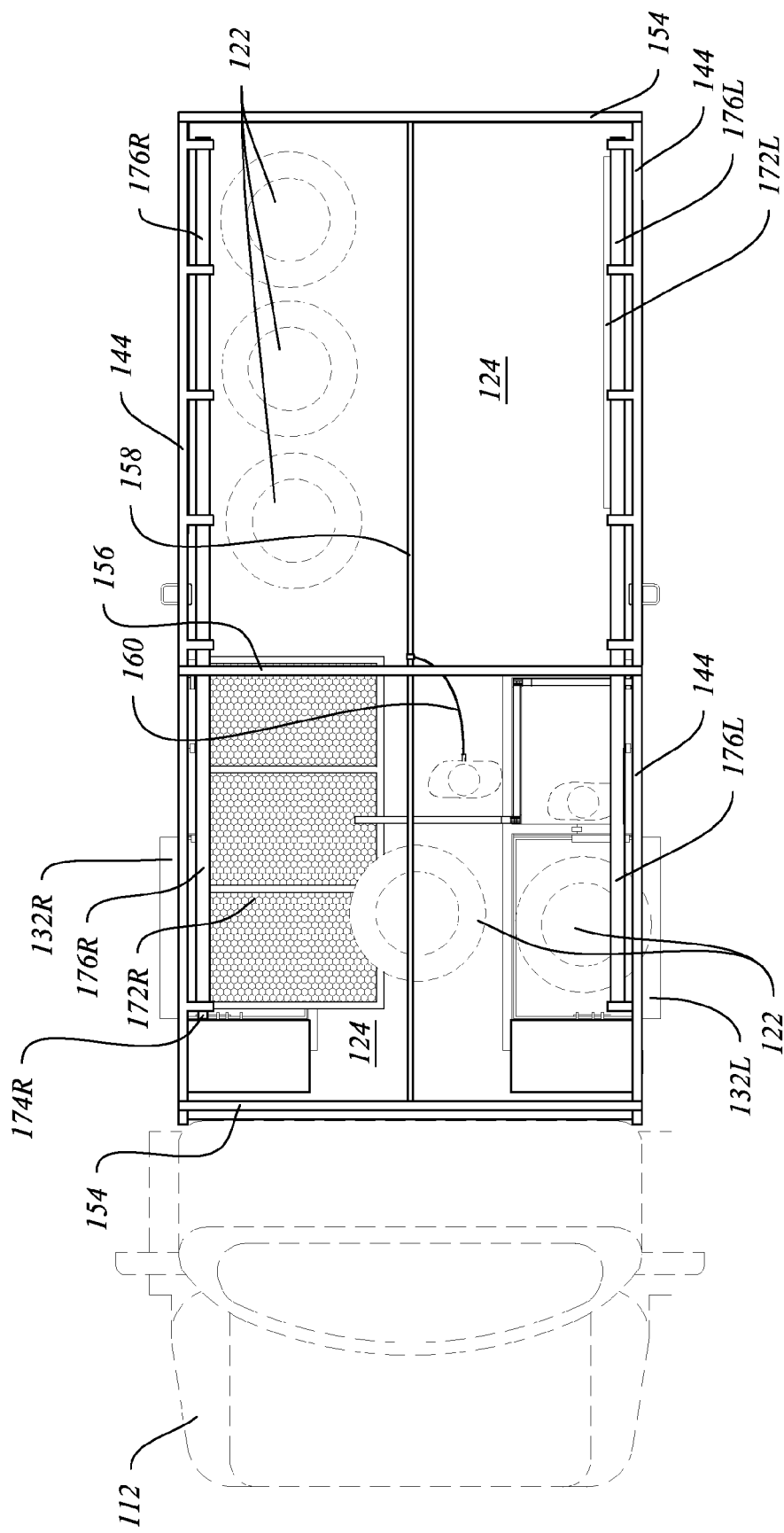
FIG. 5 is a top plan view of the embodiment of the present invention according to FIG. 4.
Figure 6A:
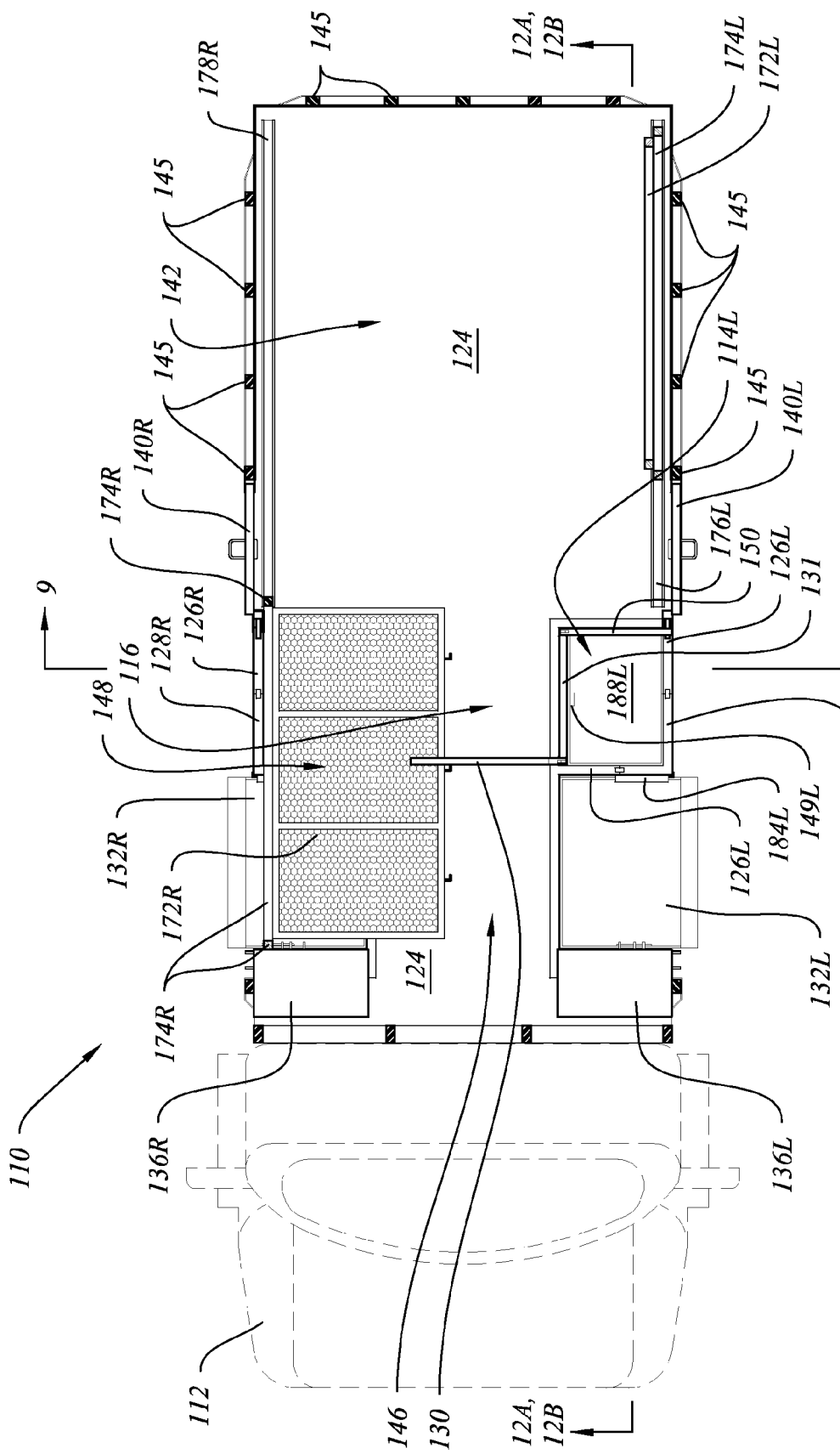
FIGS. 6A and 6B are more detailed top plan views of the embodiments of the present invention according to FIGS. 4A and 4B, showing the left and right sides, respectively, in an operational configuration.
Figure 6B:
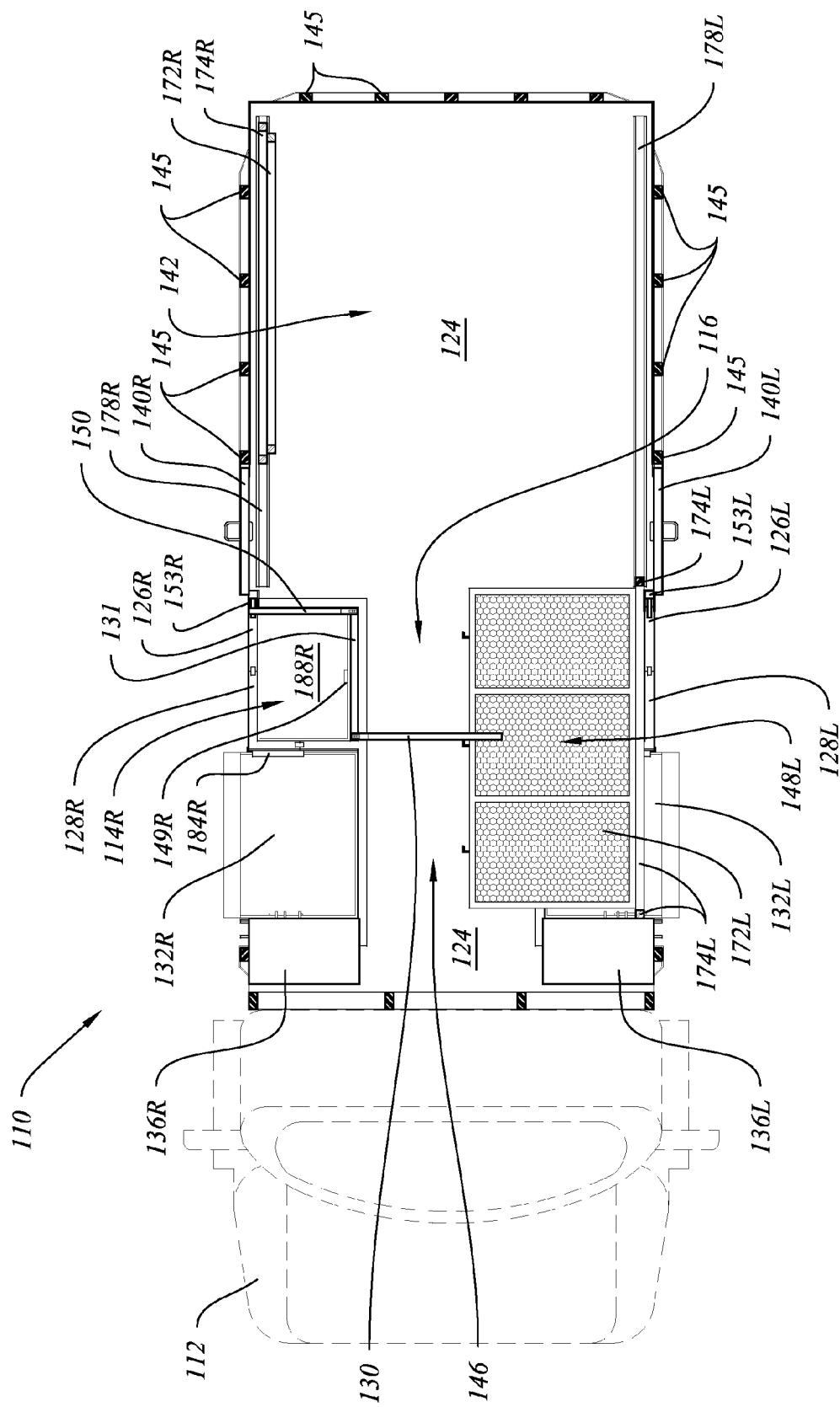
Figure 7:
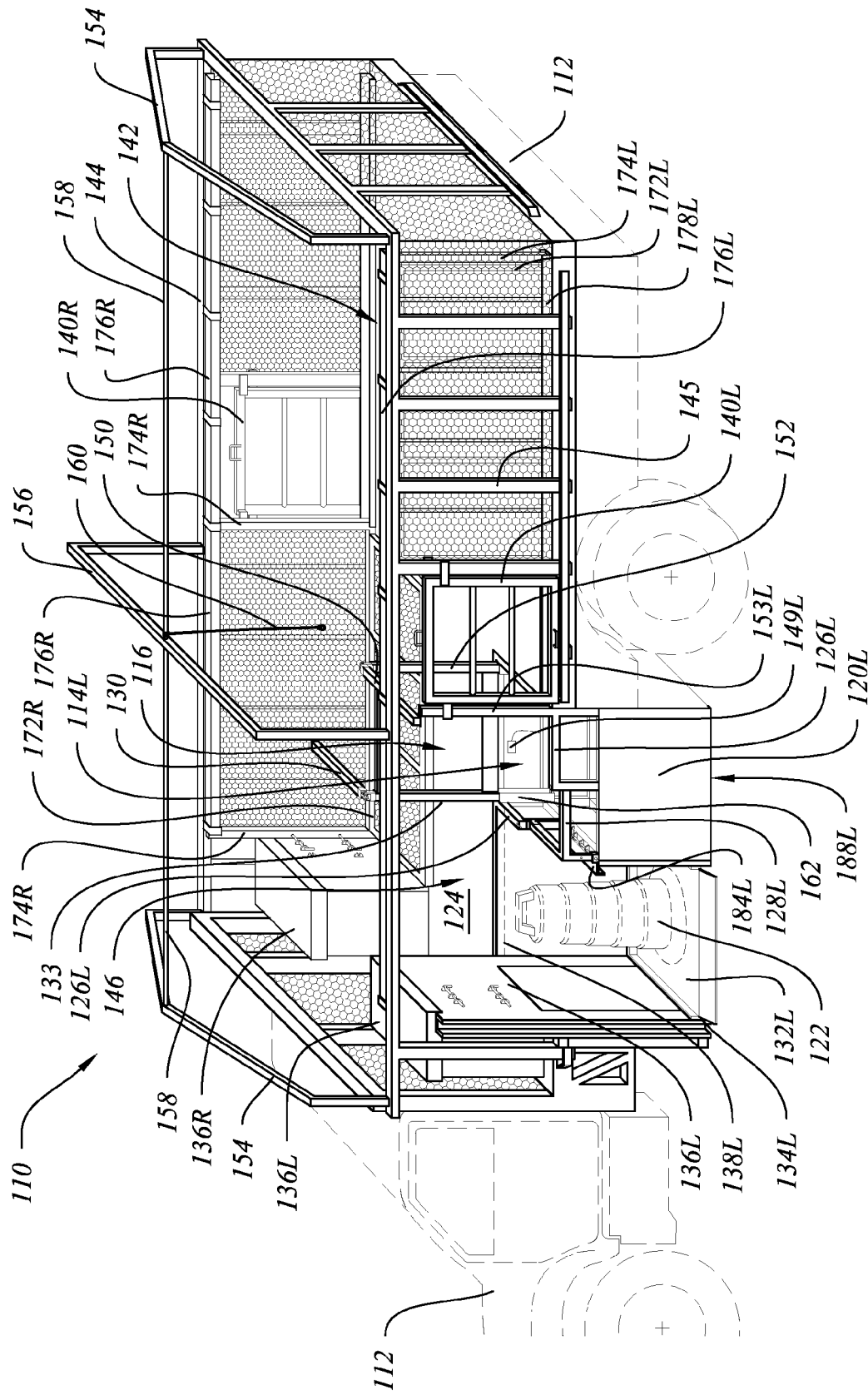
FIG. 7 is a perspective view of the embodiment of the present invention according to FIG. 4.

FIGS. 4A and 4B depict side elevation views of traffic device placement and retrieval apparatus 110 according to another embodiment of the present. FIGS. 5 and 6A and 6B show top views of apparatus 110 at varying elevations and FIG. 7 shows a perspective view of apparatus 110 as depicted in FIGS. 4A, 5 and 6A. Apparatus 110 is similar to apparatus 10 except that it has left and right operator areas 114L and 114R, left and right platforms 132L and 132R, left and right pulley systems covered by pulley covers 136L and 136R, and left and right ladders 140L and 140R located on both sides of truck 112. Operator area 116 is located between operator areas 114L and 114R and loading area 146 is located between platforms 132L and 132R. The dual sided configuration of apparatus 110 is the most preferred embodiment of the invention.

Most of the preferred features described with respect to apparatus 10 are the same for apparatus 110. Referring to FIGS. 4A, 4B, 5, and 7, apparatus 110 is preferably attached to a modified flat-bed truck 112 wherein a portion of the bed 124 and any side walls 144 have been cut away to accommodate the apparatus 110. The cab and other features of truck 112 depicted in the figures are to illustrate relative locations for elements of apparatus 110 (such as a front or forward direction being closer to the cab of truck 112), but no particular features of truck 112 are necessary for use of apparatus 110. Apparatus 110 includes right and left side operator areas 114L and 114R in which an operator or operators are located and a third operator area 116 in which a second or third operator is located during placement and retrieval of traffic devices, such as a barrel 122. Operator area 116 is preferably elevated relative to the left and right operator areas 114L and 114R, with the lower surfaces 188L and 188R of operator areas 114L and 114R being close to the roadway on which the barrel 122 is to be placed or later retrieved and the lower surface of operator area 116 bear at or near the level of truck bed 124. Operator areas 114L and 114R includes sides 120 that are preferably solid surfaces to provide additional safety for the operator located in operator areas 114L and 114R.

Apparatus 110 also includes left and right movable platforms 132L and 132R that may be raised or lowered between positions 134 and 138. Preferably, elevated position 138 is at or near the level of truck bed 124 and lower position 134 is at or near the bottom level of sides 120 of operator areas 114L and 114R. Left and right pulley covers 136L and 136R conceal the pulley system (not depicted) used to raise and lower left and right platforms 132L and 132R. Apparatus 110 also preferably includes left and right ladders 140L and 140R that may be lowered to allow operators to access the truck bed, including operator area 116, and may be closed and secured during operation of apparatus 110 or movement of truck 112. Ladders 140L and 140R preferably lift up slightly from the closed position and then slide down at an angle to allow operators to access the truck. Alternatively, ladders 140L and 140R could be hinged to fold down and up. Ladders 140L and 140R need not be configured as a traditional ladder and other step-like configurations may be used.

Referring to FIG. 5, which is a top view of apparatus 110 according to the embodiment in FIGS. 4A, 4B, and 7, apparatus 110 is preferably used with truck 112 that includes a storage area 142 for storing extra traffic devices until they are ready to be placed on the roadway or storing the traffic devices once they have been retrieved. Truck 112 also preferably includes side walls 144 around the perimeter of truck bed 124 other than where operator areas 114L and 114R and platforms 132L and 132R are located. Side walls 144 keep the traffic devices in storage area 142 from falling off truck 112 and add safety for the operator located in operator area 116. Side walls 144 are preferably at least 3 feet tall and made of a semi-open or mesh-like material supported by support rails 145 spaced at along the side walls 144. Alternatively, side walls 144 may be solid or made of other materials and may be at varying heights.

Apparatus 110 preferably includes several barriers to provide additional safety for the operator in operator area 116. Referring to FIGS. 6A and 6B, barrier 150 provides separation between storage area 142 and operator area 114L (or 114R, depending on which side is in use, as barrier 150 is movable as described below) and provides a hand rail for additional assistance when climbing up or down ladder 140L

(or 140R). Barrier 150 is preferably a bar with an open area between it and truck bed 124. This opening under barrier 150 allows the operator in operator area 114L (or 114R) to easily access operator area 114L (or 114R) from truck bed 124 after using ladder 140L (or 140R) to climb up to truck bed 124. This opening under barrier 150 also allows the operator in operator area 114L (or 114R) to easily access traffic devices that are stored near ladder 140L (or 140R), particularly smaller or lighter weight items where the use of platform 132L (or 132R) is not necessary. The operator located in operator area 116 has free access to storage area 142 to obtain or return traffic devices, such as barrel 122. When placing the traffic devices, the device is obtained from storage area 142 and placed in loading area 146 located between platforms 132L and 132R.

Barriers 130 and 131 keep the operator in operator area 116 from falling out onto the open loading area 146, onto platform 132L (or 132R), or into operator area 114L (or 114R) where the operator may be injured or even fall out of the moving truck 112. Preferably barriers 130 and 131 are around three feet high to prevent falls, but are also low enough that the operator in operator area 116 can easily bend over barrier bar 130 when loading or unloading traffic devices from loading area 146 or bend over barrier bar 131 if the operator needs to access the operator in operator area 114L (or 114R). Barrier 130 is preferably a bar with an open area between it and truck bed 124 to allow traffic devices, such as barrel 122, to easily pass underneath or around barrier 130 into the loading area 146 without the operator in operator area 116 having to lift the traffic device over barrier 130, thereby reducing the risk of injury. Similarly, barrier 131 is preferably a bar with an open area between it and truck bed 124 to allow traffic devices to easily pass underneath or around barrier 131 into operator area 114L (or 114R). This opening is useful when it is desirable to quickly place a smaller size or light weight traffic device where it would not be necessary to use platform 132L (or 132R). The use of bars for barriers 130 and 131 also provide a convenient handle bar for the operator in operator area 116 to hold onto while truck 112 is moving, particularly during stopping and starting.

Referring to FIGS. 6A, 6B, and 7, barrier 150 is supported by posts 153L or 153R (depending on which side of apparatus 110 is in use). Barriers 130 and 131 are supported by post 133, but post 133 may form part of either barrier if a solid or semi-solid surface is used for either barrier instead of a bar configuration. Barriers 130 and 131 do not enclose operator area 116 or storage area 142. There is a passage 148L or 148R (see FIGS. 6A and 6B) so that the operator in operator area 116 may easily access loading area 146 if necessary, such as to up-right barrel 122 if it falls over before being placed on platform 132L (or 132R). Alternatively, barrier bar 130 could extend nearly to or connect to sliding wall 174R (or 174L, discussed below) to enclose operator area 116 and storage area 142, although a passage under barrier bar 130 may still be open. The open nature of the preferred barriers 130 and 131 and the preferred lower height of barriers 130 and 131 make it possible for the operator in operator area 116 to access loading area 146 or operator area 114L (or 114R) by going over or under the barriers 130 and 131, preferably when truck 112 is not moving. The use of bars for barriers 130 and 131 also provide a convenient handle bar for the operator in operator area 116 to hold onto while truck 112 is moving, particularly during stopping and starting.

To allow for operation with either the left side or right side operator areas 114L and 114R of apparatus 110, barriers 130, 131, 150 and posts 133 and 152 are movable. When the left side operator area 114L is in use, as depicted in FIG. 6A, barriers 130, 131, and 150 are in the same location as depicted for barriers 30, barriers 30, 31, and 50 on apparatus 10. However, when the right side operator area 114R is in use, as depicted in FIG. 6B, these barriers are relocated to the other side of truck 112.

Figure 8:
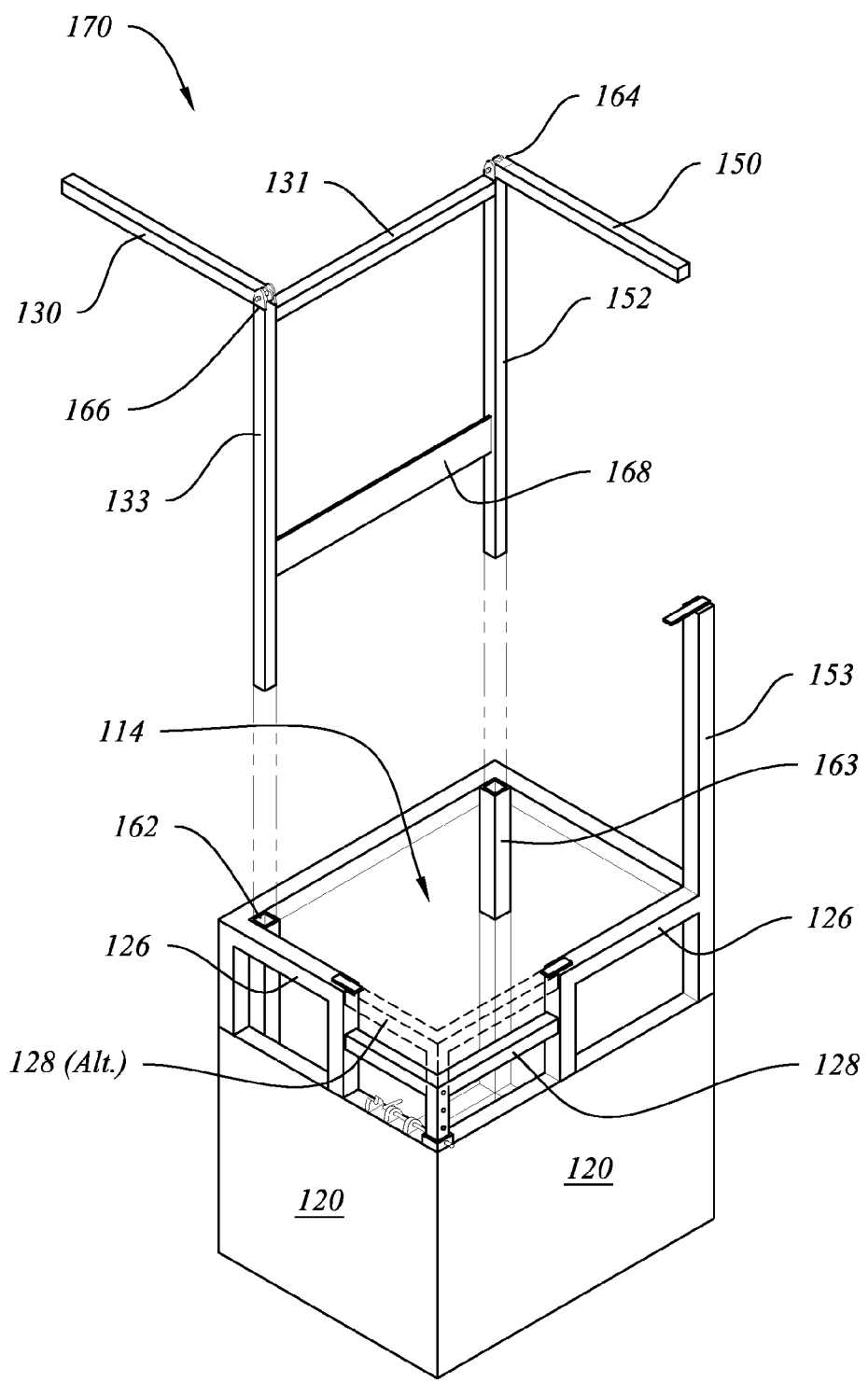
FIG. 8 is a detailed perspective view of a first operator area and a barrier unit between the first operator area and a second operator area that are part of the embodiment of the present invention according to FIG. 4.

FIG. 8 is a detailed view of these barriers and their supporting posts 133 and 152 showing how they are movable as a single barrier unit 170 for use on either side of truck 112. In apparatus 110, barrier 130 is hinged to post 133 by hinge 166 and barrier 150 is hinged to post 152 by hinge 164. Barrier 131 is attached to posts 133 and 152 in a fixed manner, such as by welding or bolting, so that barrier 131 does not move during relocation of barrier unit 170 and adds stability to barrier unit 170. Additional bar 168, located below barrier 131, is attached to posts 133 and 152 in a fixed manner, such as by welding or bolting. Apparatus 110 includes pockets 162 and 163 located in operator areas 114L (similar pockets are included on operator area 114R, although they are not depicted) Pockets 162 and 163 are preferably located in the interior corners (relative to the interior of truck 112) of operator areas 114L and 114R, with the top openings of these pockets located at or near the level of truck bed 124 (see also pocket 162 as depicted in FIG. 7). Pocket 162 holds posts 133 and pocket 163 holds post 152, allowing the posts to be removed and placed in corresponding pockets located in operator areas 114L and 114R on either side of truck 112. Bar 168 is preferably located on posts 133 and 152 between barrier 131 and the lower ends of posts 133 and 152, in a vertical position that allows sufficient length of posts 133 and 152 to slip into pockets 162 and 163 to hold barrier unit 170 securely in place. When the posts are placed in the pockets, bar 168 rests on the top of pockets 162 and 163 to prevent the barrier unit 170 from slipping downward and to maintain barriers 130, 131, and 150 at an appropriate height for the safety of the operator in operator area 116. Pockets 162 and 163 could also have solid bottoms to prevent barrier unit 170 from slipping downwards, but the use of bar 168 is preferred for added stability to barrier unit 170.

Pockets 162 and 163 may also have holes at varying heights to correspond with holes located on posts 133 and 152, to allow adjustment of the height of barrier unit 170 by insertion of a pin through the holes at the desired height. As shown in FIG. 8, barriers 130 and 152 are in the operational position for use with operator area 114L (see also FIG. 6A). When barrier unit 170 is moved to the right side of the truck 112 by inserting posts 133 and 152 into pockets 162 and 163 located in operator area 114R, barriers 130 and 150 are flipped 180° using hinges 166 and 164 to align properly with operator area 114R and 116, as depicted in FIG. 6B. Posts 153L and 153R, located on both sides of truck 112, are preferably fixed near the rear side of operator areas 114L and 114R and the exterior sides of truck 112 and provide support for barrier 150.

Apparatus 110 also preferably includes a safety harness system for the operator in operator area 116. This system includes railings 154 preferably located at both ends of truck bed 124 and railing 156 located near barrier 150 in an axial direction along the length of truck 112 and above barrier 150 in a vertical direction. Railings 154 and 156 support railing 158, which preferably is centered over the width of truck bed 124, runs the length of truck bed 124, and is elevated around 8 feet above truck bed 124. Attached to railing 158 is a releasable safety harness 160 that may be strapped onto the operator in operator area 116. Safety harness 160 is depicted as a belt-type harness, although other known harness mechanisms, such as an over-the-shoulder harness, could also be used. Safety harness 160 slides along railing 158 to allow the operator in operator area 116 to move about the back end of apparatus 110, and particularly in storage area 142. Safety harness 160 preferably is stopped from sliding along rail 158 toward the front of apparatus 110 by railing 156. The length of safety harness 160 allows the operator in operator area 116 to move from operator area 116 into loading area 146. Safety harness 160 provides additional safety for the operator in operator area 116 during movement of truck 112, particularly in the event truck 112 has to suddenly brake or is rear-ended by another vehicle safety harness 160 prevents the operator from being ejected from truck 112.

Referring to FIGS. 4A, 4B, 5, and 7, once the operator in operator area 116 has placed barrel 122 (or other traffic device) in loading area 146, the operator in operator area 114L (or 114R, depending on which side of apparatus 110 is being used) raises platform 132L (or 132R) to the elevated position 138L (or 138R), if the platform is not already in that position, using controls 149L (or 149R). The operator in operator area 116 then moves barrel 122 onto platform 132L (or 132R) and the operator in operator area 114L (or 114R) lowers platform 132L (or 132R) to its lower position 134L (or 134R). The operator in operator area 114L (or 114R) then moves barrel 122 off platform 132L (or 132R) and onto the roadway or other surface where barrel 122 is to be placed.

Barriers 126 and 128 provide additional safety for the operator in operator area 114L (or 114R) to keep the operator from falling during operation. Barrier 128 is preferably lower than barrier 126 to provide the operator in operator area 114L (or 114R) with additional space to bend over barrier 128 to facilitate moving barrel 122 from the platform to the roadway or other surface. The vertical location of barrier 128 is most preferably adjustable relative to barrier 126 (as shown by the alternate position in FIGS. 4A and 8) to accommodate operators of varying heights. A latch or pin mechanism may be used to hold barrier 128 in an elevated position. Barriers 126 and 128 are preferably bars with an open area between them and the sides 120 of operator area 114L (or 114R), which provide a convenient handle bar for the operator in operator area 114L (or 114R) to hold onto while truck 112 is moving, particularly during stopping and starting.

After moving barrel 122 from platform 132L (or 132R) onto the roadway or other surface, the operator in operator area 114L (or 114R) then raises platform 132L (or 132R) to its elevated position 138L (or 138R) so that the operator in operator area 116 can load another barrel, taken from storage area 142, from the loading area 146 to the platform. This process is repeated until all barrels or other traffic devices have been placed. To retrieve the barrels or other traffic devices, this process is repeated in reverse order. As each barrel is placed or retrieved, truck 112 moves forward along the roadway or other surface to the next location where a barrel is to be placed or retrieved (usually a few feet from the last barrel). It is not necessary for truck 112 to operate in reverse to retrieve the traffic devices.

Operator areas 114L and 114R and platforms 132L and 132R are preferably located along the side of truck 112 between the front and rear tires and do not protrude beyond the widest part of truck 112, as depicted in FIGS. 4, 5, and 7. These portions of apparatus 110 may also be located at the rear of truck 112, with modifications understood by those of ordinary skill in the art. As many vehicle collisions involve rear end impacts, the operator in operator area 114L or 114R is at greater risk if these portions of apparatus 110 are located at the rear of truck 112. Thus the location and orientation of the portions of apparatus 110 along the sides of truck 112 and near the front of truck 112 are preferred.

It is possible to use both operator areas 114L and 114R and platforms 132L and 132R at the same time according to the invention, if there were a need to place or retrieve traffic devices on both sides of truck 112 simultaneously. For use on both sides simultaneously, a second barrier unit 170 is provided to allow barriers to be in place on both sides for the safety of the operator or operators in operator area 116. If two operators are located in operator area 116, a second safety harness 160 may also be used. When not in use, the second barrier unit and second safety harness may be stored in storage area 142.

Referring to FIGS. 6A, 6B, and 7, apparatus 110 includes floor covers 172L and 172R and sliding walls 174L and 174R on both sides of apparatus 110 to add to the safety and usefulness of the dual-sided embodiment of apparatus 110. When the left side operator area 114L is in use, sliding wall 174R and floor cover 172R are slid into the area adjacent operator area 114R and platform 132R. Floor cover 172R is lowered to cover the opening for the right side operator area 114R and right side platform area 132R (as depicted in FIG. 6A), while sliding wall 174R covers the opening in side wall 144 in those areas. When the right side operator area 114R is in use, sliding wall 174L and floor cover 172L are slid into the area adjacent operator area 114L and platform 132L. Floor cover 172L is lowered to cover the opening for the left side operator area 114L and left side platform area 132L (as depicted in FIG. 6B), while sliding wall 174L covers the opening in side wall 144 in those areas. When in the lowered position, floor covers 172L and 172R provide usable work space and a flooring surface suitable for walking on or storing items and also prevent the operator in operator area 116 from falling into the open spaces. When in the closed position, sliding walls 174L and 174R also prevent items placed in loading area 146 and the operator in operator area 116 from falling out of truck 112, or onto platform areas 132L or 132R or into operator areas 113L or 114R. Floor cover 172R (or 172L) is preferably in the raised position when sliding wall 174R (or 174L) is in the open position and in the lowered position when sliding wall 174L (or 174R) is in the closed position.

Figures 9, 10:
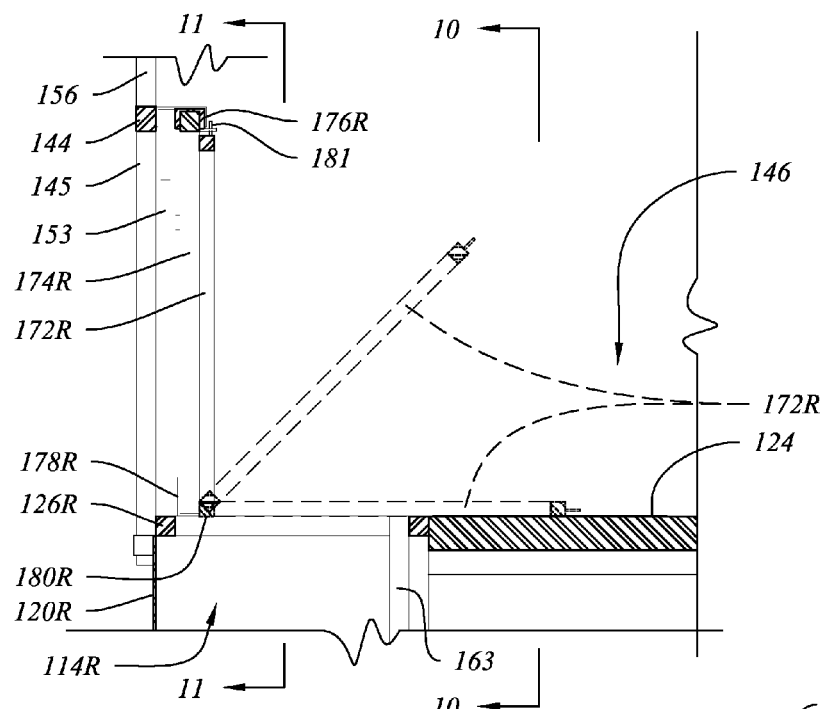
FIG. 9 is a detailed side cross-sectional view of a sliding wall and cover unit that is part of the embodiment of the present invention according to FIG. 4.
FIGS. 10 and 11 are detailed side elevational views (from the interior of the apparatus looking out) of a sliding wall and cover unit that is part of the embodiment of the present invention according to FIG. 4.

Sliding walls 174L and 174R slide along the sides of apparatus 110 in top tracks 176L and 176R (as depicted in FIGS. 7 and 9) and bottom tracks 178L and 178R (as depicted in FIGS. 6A and 6B). Top track 176L extends from pulley cover 136L toward the rear of apparatus 110 for a sufficient distance to support sliding wall 174L when it is in the open position. Bottom track 178L extends from the rear of operator area 114L backward for a sufficient distance to support sliding wall 174L when it is in the open position, but preferably does not extend further forward to avoid interfering with barriers 126 and 128 in operator area 114L or platform 132L. These same features apply to the right side cover 172R, sliding wall 174R, top track 176R, and bottom track 178R. When in the raised position, cover 172L (or 172R) is preferably secured to sliding wall 174L (or 174R) with a latch 181 so that they slide together as a single unit. Sliding wall also has a side latch 179 to secure it in place in either an open or closed position. Similar latches are used for sliding wall 174R and floor cover 172R. When sliding walls 174L and 174R are in the open position (see FIGS. 6A and 6B), floor cover 172L and 172R are in the raised position and the whole unit is stored in the rear of truck 112 adjacent storage area 142. Again, it is possible to use both operator areas 114L and 114R and platforms 132L and 132R at the same time, with the sliding walls 174L and 174R both in the open position (and floor covers 172L and 172R in the raised and secured positions).

Figure 11:
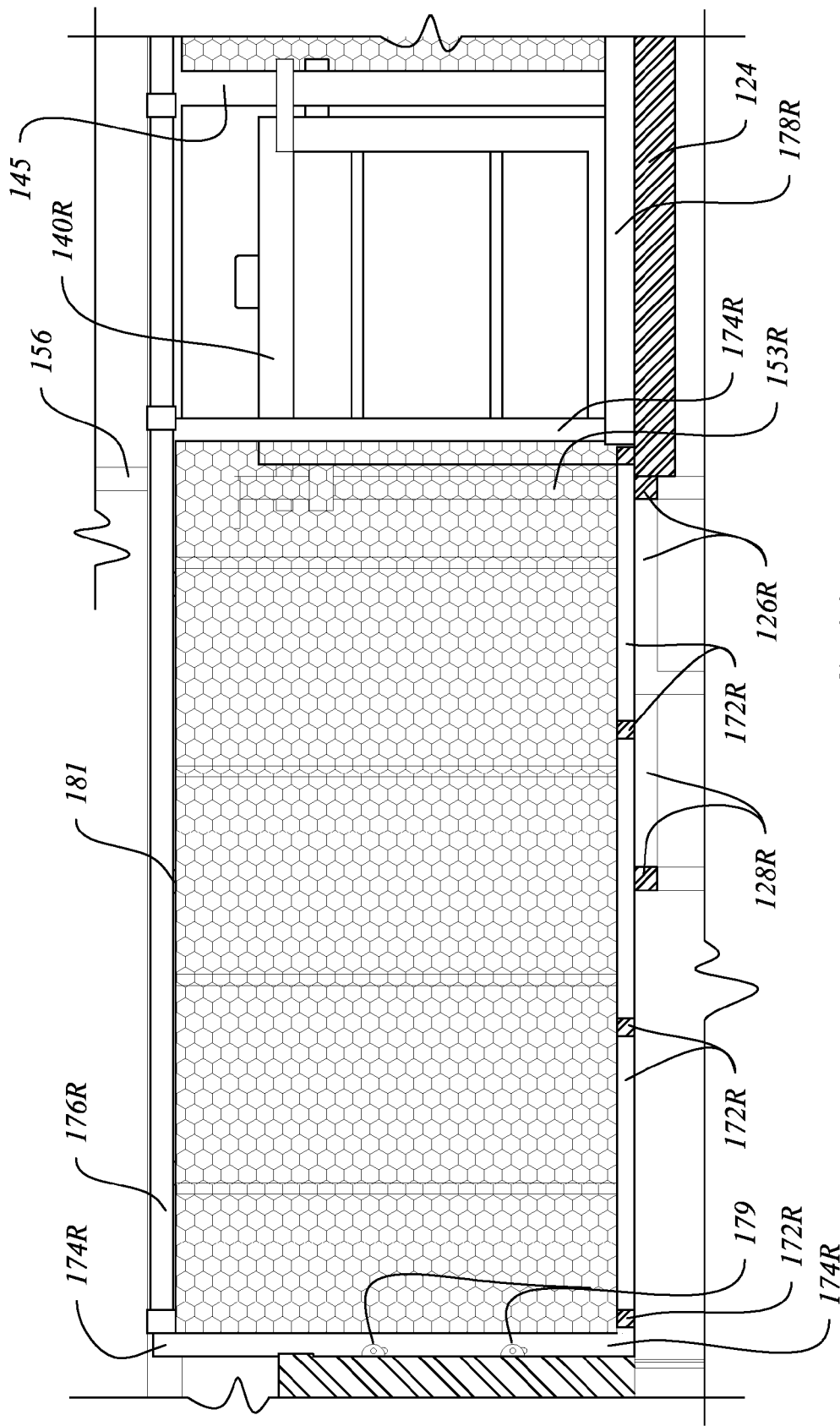

FIG. 9 shows a detailed view of floor cover 172R in its raised and lowered positions. Floor cover 172R is preferably hinged to sliding wall 174R by hinge 180R (and cover 172L is preferably hinged to sliding wall 174L by a similar hinge, which is not depicted) to facilitate raising and lowering the floor cover. FIG. 10. also shows a detailed view of sliding wall 174R in its closed position (from a perspective inside truck 112 looking out, when operator area 114R is not in use) and floor cover 172R in its raised position, just before it is lowered. FIG. 11 shows another detailed view of sliding wall 174R in its closed position (from a perspective inside truck 112 looking out, when operator area 114R is not in use) and floor cover 172R in its lowered position.

Figure 12A:
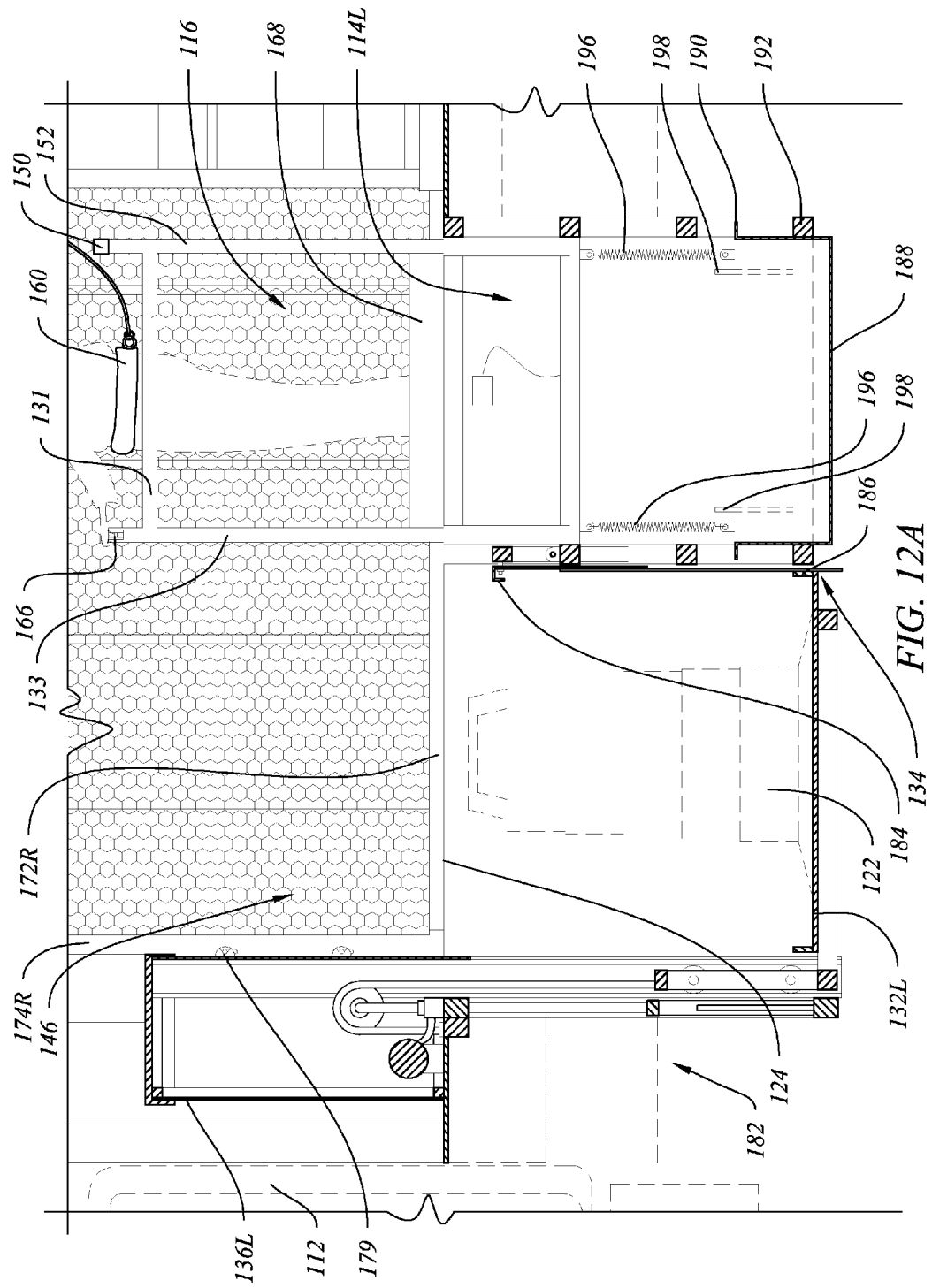
FIGS. 12A and 12B are detailed side cross-sectional views of an operator area and moveable platform according to another embodiment of the present invention.
Figure 12B:
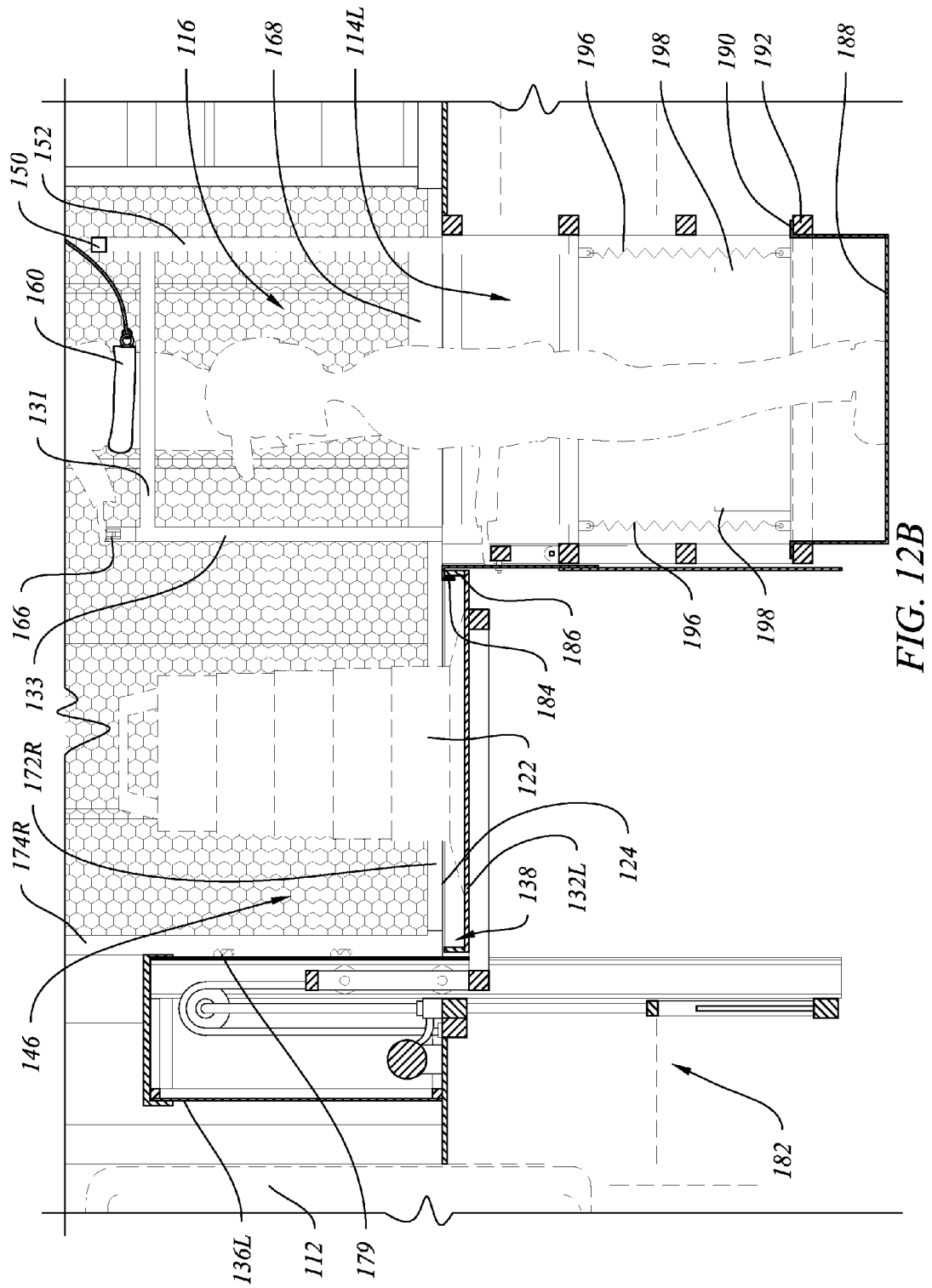

FIGS. 12A and 12B are cross-sectional detailed views of a platform and first operator area according to another preferred embodiment of the invention. Although FIGS. 12A and 12B refer to the left side aspects of apparatus 110, it is understood that each of the features depicted are also preferably included in platform 132R and operator area 114R. FIG. 12A shows platform 132L in its lowered position 134 for moving traffic device 122 from apparatus 110 to the roadway or from the roadway onto apparatus 110. FIG. 12B shows platform 132L in its raised position 138 for moving traffic device from loading area 146 onto platform 132L or from platform 132L into loading area 146. Pulley system 182, which is preferably a modified fork lift system, is also depicted in FIGS. 12A and 12B. As platform 132L moves from lower position 134 to raised position 138, a lip 186 catches safety shield 184, lifting safety shield 184 up to cover over the opening between barriers 126 and 128 and side 120 of operator area 114L (see also FIG. 7). As platform 132L is lowered, safety shield 184 is also lowered to uncover the opening. Safety shield 184 prevents objects, such as the hands of the operator in operator area 114L, from being caught by platform 132L while it is moving.

Operator area 114L also has a movable bottom surface 188. When the operator enters operator area 114L and puts weight on bottom surface 188, springs 196 allow bottom surface 188 to move downward to allow the operator to be closer to the roadway where traffic device 22 is to be placed or from which it is to be retrieved, as shown in FIG. 12B. The downward motion is limited by lip 190 which catches on bar 192 to prevent bottom surface 188 from moving too close to the roadway. When the operator exits operator area 114L and the weight is removed, bottom surface 188 returns to its original position, as shown on FIG. 12A. The raised, original position for bottom surface 188 helps prevent it from catching on any debris that may be in the roadway, particularly when truck is moving at full speed and the operator areas are not in use. Bottom surface 188 is stabilized during vertical movement by rods 198 inserted through holes in bottom surface 188, so that bottom surface 188 slides along the rods 198 when moving up and down. The features depicted in FIGS. 12A and 12B are preferably also used in operator area 14 and platform 32 of apparatus 10.

As used herein, references to traffic devices include cones, barrels, signs, barriers, and other devices used as part of construction or maintenance projects on highways, interstates, roadways, streets, and parking lots to provide warning or notice to passing vehicles and pedestrians, block-off the work zone, or prevent unauthorized vehicles or persons from entering the work zone. References to a truck herein are not intended to be limiting and include any type of vehicle suitable for placing and retrieving traffic devices. Additionally, references to a road, highway, or roadway herein are not intended to be limiting and include any type of surface on which traffic devices may be placed, including parking lots.

Other alterations and modifications of the invention will be apparent to those of ordinary skill in the art upon reading this specification in view of the accompanying drawings, and it is intended that the scope of the invention disclosed herein be limited only by the broadest interpretation of the appended claims to which the inventor is legally entitled.

We claim:

1. A traffic device placement and retrieval apparatus comprising:
   a first operator area on the apparatus, the first operator area including a first surface on which a first operator may stand on the apparatus;
   a second operator area on the apparatus, the second operator area including a second surface on which a second operator may stand on the apparatus; and
   a movable platform to raise and lower one or more traffic devices between a vertical level near a lower end of the first operator area and a vertical level near a lower end of the second operator area;
   wherein the first operator area comprises:
   a vertically moveable lower surface;
   side walls located on at least three sides;
   a controller for raising and lowering the movable platform;
   at least one handle bar located at the upper end of the side wall adjacent the movable platform; and
   a movable shield between the handle bar and the movable platform.

2. The apparatus of claim 1 wherein the second operator area is located adjacent to and vertically above the first operator area and the first operator area is located vertically near a surface on which the traffic devices are to be placed.

3. The apparatus of claim 1 further comprising a storage area adjacent the second operator area for storing traffic devices.

4. The apparatus of claim 1 further comprising a barrier unit located between the first and second operator areas.

5. The apparatus of claim 4 wherein the barrier unit comprises at least one vertical bar and at least one horizontal bar to provide safety for an operator located in the second operator area.

6. The apparatus of claim 5 wherein there is an open area between the at least one horizontal bar and the lower end of the second operator area that allows traffic devices to be passed between the first and second operator areas.

7. The apparatus of claim 1 further comprising a flat bed truck wherein a portion of the truck bed is removed to accommodate the first operator area and the movable platform.

8. The apparatus of claim 7 further comprising walls around a portion of the perimeter of the truck bed to provide safety for an operator located in the second operator area.

9. The apparatus of claim 8 further comprising a ladder that may be lowered to allow an operator to access the second operator area.

10. The apparatus of claim 7 further comprising a harness that is releasably attached to a railing located above the second operator area and that is releasably attached to an operator located in the second operator area.

11. The apparatus of claim 1 wherein the position of at least a portion of the handle bar is vertically adjustable and wherein the movable shield is raised when the movable platform is raised and the movable shield is lowered when the movable platform is lowered.

12. A traffic device placement and retrieval apparatus comprising:
   a first operator area on the apparatus, the first operator area including a first surface on which an operator may stand on the apparatus;
   a second operator area on the apparatus, the second operator area including a second surface on which an operator may stand on the apparatus;

a third operator area on the apparatus, the third operator area including a third surface on which an operator may stand on the apparatus;

a first movable platform to raise and lower one or more traffic devices between a vertical level near a lower end of the first operator area and a vertical level near a lower end of the third operator area;

a second movable platform to raise and lower one or more traffic devices between a vertical level near a lower end of the second operator area and a vertical level near a lower end of the third operator area;

a flatbed truck wherein a portion of the truck bed is removed to accommodate the first and second operator areas and the first and second movable platforms; and walls around a portion of the perimeter of the truck bed to provide safety for an operator located in the third operator area;

wherein the first and second operator areas each comprise:

a vertically moveable lower surface;

side walls located on at least three sides;

a controller for raising and lowering the first or second movable platform;

at least one handle bar located at the upper end of the side wall adjacent the movable platform; and a movable shield adjacent the handle bar.

13. The apparatus of claim 12 wherein the third operator area is located adjacent to and vertically above the first and second operator areas and the first and second operator areas are located vertically near a surface on which the traffic devices are to be placed.

14. The apparatus of claim 12 further comprising a storage area adjacent the third operator area for storing traffic devices.

15. The apparatus of claim 12 further comprising a barrier unit located adjacent the third operator area.

16. The apparatus of claim 15 wherein the barrier unit comprises at least one vertical bar and at least one horizontal bar to provide safety for an operator located in the third operator area.

17. The apparatus of claim 16 wherein a first horizontal bar is pivotally attached to a first vertical bar and a second horizontal bar is pivotally attached to a second vertical bar, with a third and fourth horizontal bars securely attached to both the first and second vertical bars.

18. The apparatus of claim 17 wherein the first and second operator areas each comprise first and second pockets to hold the first and second vertical bars of the barrier unit, so that the barrier unit may be moved between the first and second operator areas and the first and second horizontal bars may be rotated 180°.

19. The apparatus of claim 16 wherein there is an open area between the at least one horizontal bar and the lower end of the third operator area that allows traffic devices to be passed between the third operator area and the first and second operator areas.

20. The apparatus of claim 12 further comprising a harness that is releasably attached to a railing located above the third operator area and that is releasably attached to an operator located in the third operator area.

21. The apparatus of claim 12 wherein the position of at least a portion of the handle bar is vertically adjustable and wherein the movable shield in the first operator area is raised and lowered in relation to the first movable platform and the movable shield in the second operator area is raised and lowered in relation to the second movable platform.

22. The apparatus of claim 12 further comprising at least one ladder that may be lowered to allow an operator to access the third operator area.

23. The apparatus of claim 12 wherein at least one portion of the walls is movable to close off operator access to the first operator area.

24. The apparatus of claim 23 wherein a second portion of the walls is movable to close off operator access to the second operator area.

25. The apparatus of claim 24 further comprising two floor covers each pivotally attached to the first and second portions of the walls that are movable and wherein the first floor cover may be lowered to cover over the first operator area and first movable platform when not in use and the second floor cover may be lowered to cover over the second operator area and second movable platform when not in use.

* * * * *